(12) United States Patent
Son et al.

(10) Patent No.: US 12,373,530 B2
(45) Date of Patent: Jul. 29, 2025

(54) METHOD FOR AUTHENTICATING USER FOR eKYC AUTOMATION

(71) Applicant: Fullstack Inc., Seoul (KR)

(72) Inventors: Sungho Son, Seoul (KR); Juri Seo, Namyangju-si (KR)

(73) Assignee: Fullstack Inc., Seoul (KR)

( * ) Notice: Subject to any disclaimer, the term of this patent is extended or adjusted under 35 U.S.C. 154(b) by 134 days.

(21) Appl. No.: 18/519,076

(22) Filed: Nov. 27, 2023

(65) Prior Publication Data

US 2025/0156512 A1    May 15, 2025

(30) Foreign Application Priority Data

Nov. 13, 2023   (KR) .......................... 10-2023-0156193

(51) Int. Cl.
*G06F 21/32*    (2013.01)
*G06V 30/10*    (2022.01)

(52) U.S. Cl.
CPC .............. *G06F 21/32* (2013.01); *G06V 30/10* (2022.01)

(58) Field of Classification Search
CPC ................................. G06F 21/32; G06V 30/10
See application file for complete search history.

(56) References Cited

U.S. PATENT DOCUMENTS

| | | | | |
|---|---|---|---|---|
| 9,798,871 B2 * | 10/2017 | Suh | .......................... | G06F 21/32 |
| 10,772,675 B2 * | 9/2020 | Whitcher | ........... | A61B 18/1445 |
| 11,139,976 B2 * | 10/2021 | Khan | ..................... | H04L 9/0637 |
| 11,303,631 B1 * | 4/2022 | Alexanian | ............... | G06F 21/45 |
| 11,681,817 B2 * | 6/2023 | Kadiyala | ................. | G06F 40/20 726/26 |
| 11,888,849 B1 * | 1/2024 | Slowiak | .............. | H04L 63/0884 |
| 11,924,200 B1 * | 3/2024 | Bergano | ................ | H04L 9/3247 |
| 2019/0251239 A1 * | 8/2019 | Kim | ........................ | G06F 21/32 |
| 2021/0124919 A1 * | 4/2021 | Balakrishnan | ....... | B42D 25/309 |
| 2021/0273804 A1 * | 9/2021 | Khan | .................... | H04L 9/3234 |
| 2021/0365292 A1 * | 11/2021 | K S | ........................ | G06F 9/5011 |
| 2023/0026228 A1 * | 1/2023 | Robinson-Morgan | ........................ | H04L 67/306 |

FOREIGN PATENT DOCUMENTS

| | | |
|---|---|---|
| KR | 10-2303754 B1 | 9/2021 |
| KR | 10-2363940 B1 | 2/2022 |
| KR | 10-2022-0032146 A | 3/2022 |
| KR | 10-2022-0086998 A | 6/2022 |
| KR | 10-2408528 B1 | 6/2022 |
| KR | 10-2410588 B1 | 6/2022 |

\* cited by examiner

*Primary Examiner* — Viral S Lakhia
(74) *Attorney, Agent, or Firm* — Park, Kim & Suh, LLC

(57) ABSTRACT

A method for authenticating a user, which is performed by at least one processor, includes obtaining an image an identity (ID) card, assigning a parameter score to at least one parameter included in the image of the ID card, assigning an accuracy score to the at least one parameter extracted through character recognition, based on the image of the ID card, setting a first weight for the parameter score and a second weight for the accuracy score, setting a weight related to a priority for the at least one parameter, and calculating an authentication score based on the parameter score, the accuracy score, the first weight, the second weight, and the weight related to the priority.

11 Claims, 9 Drawing Sheets

FIG. 8

| PARAMETER | FIRST GROUP (FIRST GROUP WEIGHT : 70%) | | | | | SECOND GROUP (SECOND GROUP WEIGHT : 30%) | | | |
|---|---|---|---|---|---|---|---|---|---|
| | NAME | DATE OF BIRTH | ID CARD NUMBER | ID CARD TYPE | ISSUE DATE | EXPIRATION DATE | GENDER | NATIONALITY |
| PARAMETER SCORE (A) BASED ON CHARACTER RECOGNITION RESULT | 1 | 0.5 | 0.5 | 0.5 | 1 | 1 | 0.5 | 0.5 |
| WEIGHT (B) BASED ON USER INPUT VALUE | 0.8 | 0.5 | 0.5 | 0.5 | 1 | 0.5 | 0.5 | 0.5 |
| FINAL PARAMETER SCORE (C=A*B) | 0.8 | 0.25 | 0.25 | 0.25 | 1 | 0.5 | 0.25 | 0.25 |
| ACCURACY SCORE (D) | 0.87 | 0 | 0 | 0 | 0.9 | 0.95 | 0 | 0 |
| SCORE (E=0.7*C+0.3*D) IN WHICH WEIGHTS OF PARAMETER SCORE AND ACCURACY SCORE ARE REFLECTED | 0.821 | 0.175 | 0.175 | 0.175 | 0.97 | 0.635 | 0.175 | 0.175 |
| MULTIPLE VALUE (F) | 3 | 3 | 3 | 3 | 1 | 1 | 3 | 2 |
| SCORE (G=E*F) IN WHICH MULTIPLE SCORE IS REFLECTED | 2.463 | 0.525 | 0.525 | 0.525 | 0.97 | 0.635 | 0.525 | 0.35 |
| COMPARISON (H) WITH REFERENCE VALUE | 1 | 0.525 | 0.525 | 0.525 | 0.97 | 0.635 | 0.525 | 0.33 |
| SCORE (I) IN WHICH GROUP WEIGHT IS REFLECTED | 17.5 (H*70/4) | 9.1875 (H*70/4) | 9.1875 (H*70/4) | 9.1875 (H*70/4) | 7.275 (H*30/4) | 4.7625 (H*30/4) | 3.9375 (H*30/4) | 3.3125 (H*30/4) |
| AUTHENTICATION SCORE (J) | 62.35 (TOTAL VALUE OF I) | | | | | | | |

FIG. 9

| PARAMETER | FIRST GROUP (FIRST GROUP WEIGHT: 70%) | | SECOND GROUP (SECOND GROUP WEIGHT: 30%) | |
|---|---|---|---|---|
| | NAME | DATE OF BIRTH | GENDER | NATIONALITY |
| PARAMETER SCORE (A) BASED ON CHARACTER RECOGNITION RESULT | 1 | 1 | 0.5 | 0.5 |
| WEIGHT (B) BASED ON USER INPUT VALUE | 0.8 | 0.5 | 0.5 | 0.5 |
| FINAL PARAMETER SCORE (C=A*B) | 0.8 | 0.5 | 0.25 | 0.25 |
| ACCURACY SCORE (D) | 0.87 | 0.65 | 0 | 0 |
| SCORE (E=0.7*C+0.3*D) IN WHICH WEIGHTS OF PARAMETER SCORE AND ACCURACY SCORE ARE REFLECTED | 0.821 | 0.545 | 0.175 | 0.175 |
| MULTIPLE VALUE (F) | 1 | 1 | 1 | 1 |
| SCORE (G=E*F) IN WHICH MULTIPLE SCORE IS REFLECTED | 0.821 | 0.545 | 0.175 | 0.175 |
| COMPARISON (H) WITH REFERENCE VALUE | 0.821 | 0.545 | 0.175 | 0.175 |
| SCORE (I) IN WHICH GROUP WEIGHT IS REFLECTED | 28.735 (I*70/2) | 19.075 (I*70/2) | 2.625 (I*30/2) | 2.625 (I*30/2) |
| AUTHENTICATION SCORE (J) | 53.06 (TOTAL VALUE OF I) | | | |

# METHOD FOR AUTHENTICATING USER FOR eKYC AUTOMATION

CROSS-REFERENCE TO RELATED APPLICATIONS

This application claims priority under 35 U.S.C. § 119 to Korean Patent Application No. 10-2023-0156193 filed on 13 Nov. 2023, in the Korean Intellectual Property Office, the disclosures of which are incorporated by reference herein in their entireties.

BACKGROUND

Embodiments of the present disclosure described herein relate to a method for authenticating a user, and more particularly, relate to a method for automating an electronic know your customer (eKYC) process performed by an agent in a related art.

An electronic know your customer (eKYC) process is to verify the identity of a customer. The customer may be rapidly and effectively authenticated through the eKYC process, when compared to a conventional physical manner. The eKYC process is mainly used by financial institutions and digital service providers, and allows customers to identify themselves and to safely use services. In detail, the eKYC process is performed by utilizing a technology, such as face recognition or biometrics recognition.

However, the process of authenticating the identity of the customer cannot be fully automated by merely introducing a present eKYC technology. For example, even if information about an identity (ID) card is extracted by recognizing a customer ID card, an agent is needed to verify whether extracted information is accurate and whether information entered by a user is matched with the information about the ID card. Therefore, a technology for full automation using the eKYC process is needed.

SUMMARY

Embodiments of the present disclosure provide a method for authenticating a user by enabling an automated eKYC process.

According to an embodiment, a method for authenticating a user, which is performed by at least one processor, may include obtaining an image of an identity (ID) card, assigning a parameter score to at least one parameter included in the image of the ID card, assigning an accuracy score to the at least one parameter extracted through character recognition, based on the image of the ID card, setting a first weight for the parameter score and a second weight for the accuracy score, setting a weight related to a priority for the at least one parameter, and calculating an authentication score based on the parameter score, the accuracy score, the first weight, the second weight, and the weight related to the priority.

In this case, the assigning of the parameter score may include comparing a result extracted through the character recognition with the at least one parameter, based on the image of the ID card, signing a first value to the parameter score, when a parameter included in the at least one parameter is included in the extracted result, and assigning a second value to the parameter score, when the parameter included in the at least one parameter is not included in the extracted result.

In this case, the method may further include obtaining a user input value for the at least one parameter, and the assigning of the parameter score may include comparing the extracted result with the user input value with respect to the at least one parameter, multiplying the parameter score by a third value, when the extracted result is equal to the user input value, and multiplying the parameter score by a fourth value, when the extracted result is different from the user input value.

In this case, the assigning of the parameter score may include multiplying the parameter score by a first multiple value, when the parameter included in the at least one parameter is related to verification by the government, multiplying the parameter score by a second multiple value smaller than the first multiple value, when the parameter is related to a bar code or a region to be read by a machine, and setting a reference value as the parameter score, when the parameter score is greater than the reference value.

In this case, the assigning of the accuracy score may include setting a reliability score for the character recognition for the at least one parameter, as the accuracy score, and setting an average of a plurality of reliability scores, as a reliability score for one parameter, when the plurality of reliability scores are provided for the one parameter.

In this case, the first weight may be higher than the second weight.

In this case, the setting of the weight related to the priority may include classifying parameters included in the at least one parameter into a first group related to user authentication and a second group related to verification of the ID card, setting a first group weight for the first group and a second group weight for the second group, setting a weight for each of parameters included in the first group, such that a sum of the weights of the parameters included in the first group is equal to the first group weight, and setting a weight for each of parameters included in the second group, such that a sum of the weights of the parameters included in second first group is equal to the second group weight.

In this case, the first group weight may be greater than the second group weight, and a weight of one parameter included in the second group may be set to be equal to or less than a threshold value.

In this case, the weight of each parameter included in the first group is set as a value that the first group weight divided by the number of parameters included in the first group.

In this case, the at least one parameter may include at least one of a name, a date of birth, an ID card number, an ID type, an expiration date, an issue date, a gender, and a nationality.

In this case, the first weight, the second weight, the first group weight, and the second group weight may be set through an artificial intelligence (AI) model.

In this case, the method may further include authenticating an identity of a user corresponding to the image of the ID card, when the authentication score is equal to or greater than an authentication reference value.

In this case, a computer program recorded in a computer-readable medium to execute the method for authenticating the user may be provided.

BRIEF DESCRIPTION OF THE FIGURES

The above and other objects and features of the present disclosure will become apparent by describing in detail embodiments thereof with reference to the accompanying drawings.

FIGS. 8 and 9 are views illustrating an authentication score through a method for authenticating a user.

DETAILED DESCRIPTION

Figure 1:
FIG. 1 is a view illustrating an environment to which a method for authenticating a user is applicable, according to an embodiment.

The following embodiments are provided only for allowing those skilled in the art to apparently understand the spirit of the present disclosure, and the present disclosure is not limited to embodiments described in the present disclosure. The scope of the present disclosure is interpreted as including modifications or variations without departing from the spirit of the present disclosure.

The terminology of the present disclosure is selected as a common word currently and extensively used, based on the function of the invention of the subject application, which is varied depending on an intent, a precedent, or the appearance of a novel technology. Otherwise, when specific terminology is used defined as an arbitrary meaning, the meaning will be described additionally. Accordingly, the terminology used in the present disclosure should be interpreted based on the real meaning of the terminology and the whole content of the present disclosure, instead of merely using the name of the terminology.

The accompanying drawings of the present disclosure are provided to easily describe the invention of the present disclosure. The shape illustrated in the drawing may be exaggerated if necessary for the illustrative purpose. Accordingly, the present disclosure is not limited to the accompanying drawings.

In addition, in the following description of the present disclosure, a detailed description of well-known art or functions will be ruled out in order not to unnecessarily obscure the gist of the present disclosure.

FIG. 1 is a view illustrating an environment to which a method for authenticating a user is applicable, according to an embodiment.

Referring to FIG. 1, according to an embodiment, a method for authenticating a user may be performed by a user authenticating server 1000. The user authenticating server 1000 may be a computing device including at least one processor. In detail, the user authenticating server 1000 may include modules including processes classified based on functions.

The user authenticating server 1000 may make transmission or reception with a user terminal 2000. Although FIG. 1 illustrates only one user terminal 2000 making communication with the user authenticating server 1000, the present disclosure is not limited thereto. For example, a plurality of user terminals may make communication with the user authenticating server 1000.

The user authenticating server 1000 and the user terminal 2000 may make communication with each other in a wired manner or a wireless manner. For example, the user authenticating server 1000 may make data communication with the user terminal 2000 through a communication scheme, such as WiFi, Bluetooth, Zigbee, Matter, and RFID, but the present disclosure is not limited thereto.

The user terminal 2000 may be a user terminal to perform user authentication. For example, the user terminal 2000 may be a computing device, such as a smartphone, a table personal computer (PC), or a PC, but the present disclosure is not limited thereto. The user terminal 2000 may transmit an image for authenticating the user to the user authenticating server 1000. For example, the user terminal 2000 may transmit an image, which is obtained by capturing an ID card, to the user authenticating server 1000.

The user authenticating server 1000 may authenticate the user based on data obtained from the user terminal 2000. Hereinafter, the method for authenticating the user, which is performed by the user authenticating server 1000, will be described in detail.

Figure 2:
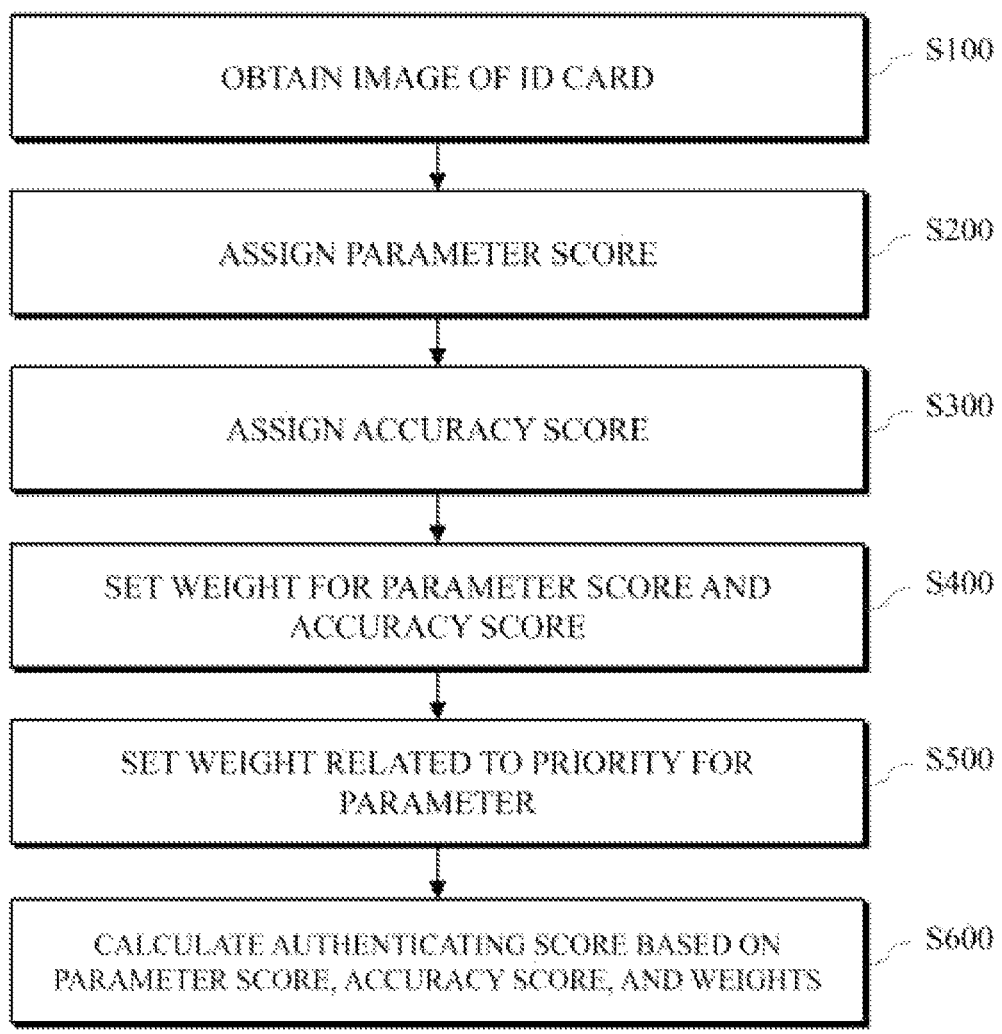
FIG. 2 is a flowchart illustrating a method for authenticating a user, according to an embodiment.

FIG. 2 is a flowchart illustrating a method for authenticating a user, according to an embodiment.

Referring to FIG. 2, according to an embodiment, the method for authenticating the user includes obtaining an image (or an ID card image) of an ID card (S100), assigning a parameter score (S200), assigning an accuracy score (S300), setting weights for the parameter score and the accuracy score (S400), setting a weight related to a priority for a parameter (S500), and calculating an authenticating score based on the parameter score, the accuracy score, and weights (S600) Although FIG. 2 illustrates that S100 to S600 are sequentially performed, some steps may be merged and simultaneously performed, or a new step may be added between S100 and S600

The obtaining of the image of the ID card (S100) may include obtaining, by the user authenticating server 1000, data from the user terminal 2000. For example, the image of the ID card may be an image obtained by capturing an ID card such as a resident registration card, a passport, a public official card, a national technical certificate, a welfare card (registration of persons with disabilities), a national merit certificate, a sailor notebook, a crew card, a teacher certificate, a discharge card, or a Jeju citizenship card.

The user authenticating server 1000 may apply a character recognizing technology to the captured ID card image. For example, the user authenticating server 1000 may extract information from the ID card image through an OCR technology or an artificial intelligence (AI) model for extracting a text. In this case, the user authenticating server 1000 may obtain a character recognition-extraction result (or a character recognition result) including the extracted information and reliability for the extracted information.

The character recognition-extraction result may include information about at least one parameter and reliability for the information. In this case, the at least one parameter may include at least one of a name, the date of birth, an ID card number, an ID type, an expiration date, an issue date, a gender, and a nationality, but the present disclosure is not limited thereto. The at least one parameter may be varied depending on ID cards.

For example, the character recognition-extraction result may include information of "Hong, gil-dong" and 90% reliability for the extraction of a parameter of the name, with respect to the parameter of the name. In addition, the character recognition-extraction result may include information of '1980.07.23' and 93% reliability for the extraction of a parameter of the date of birth, with respect to the parameter of the date of birth.

The assigning of the parameter score (S200) may including assigning, by the user authenticating server 1000, a score to a result extracted from the ID card image obtained in S100. In detail, the user authenticating server 1000 may assign the score using a character recognition result for at least one parameter. Hereinafter, the details thereof will be described with reference to FIGS. 3 and 4.

The assigning of the accuracy score (S300) may include assigning, by the user authenticating server 1000, the accuracy score to the result extracted from the ID card image obtained in S100. In detail, the user authenticating server 1000 may assign the accuracy score using the reliability for the character recognition result. The details thereof will be described with reference to FIG. 5 later.

The setting of the weights for the parameter score and the accuracy score (S400) may include setting weights for the scores assigned by the user authenticating server 1000 in S200 and S300, and applying the weights. In detail, the user authenticating server 1000 may set a first weight for the parameter score and set a second weight for the accuracy score. The user authenticating server 1000 may calculate an intermediate score applied with the weights, by adding a value obtained by multiplying the first weight by the parameter score and a value obtained by multiplying the second weight by the accuracy score.

In addition, the user authenticating server 1000 may multiply a multiple value based on a parameter included in the at least one parameter. The details thereof will be described with reference to FIG. 6 later.

The setting of the weight related to the priority for the parameter (S500) may include setting, by the user authenticating server 1000, weights for parameters, which have higher priorities for user authentication, among the at least one parameter. Specifically, the user authenticating server 1000 may classify parameters included in at least one parameter into a first group related to user authentication and a second group related to identity authentication. The details thereof will be described with reference to FIG. 7 later.

The calculating of the authenticating score based on the parameter score, the accuracy score, and weights (S600) may include calculating, by the user authenticating server 1000, a final authentication score, based on information about assigning the score or setting the weights performed between S200 and S500. When the authentication score is equal to or greater than a reference numeric value, the user authenticating server 1000 may authenticate an ID of a user corresponding to the ID card image. The details thereof will be described with reference to FIGS. 8 and 9 later.

Figure 3:
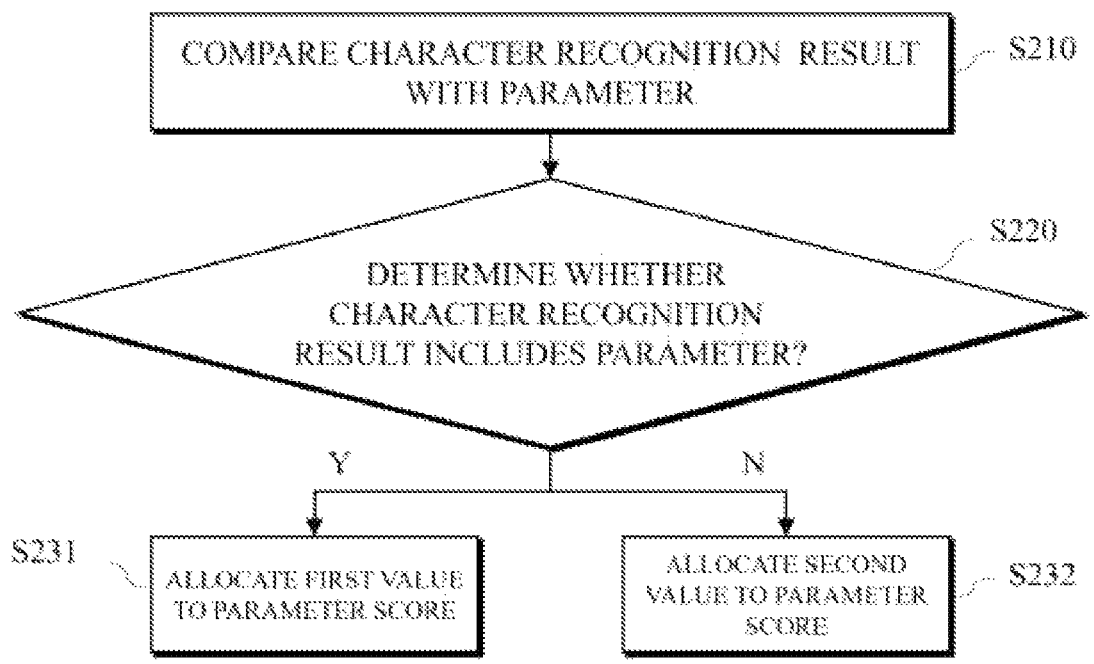
FIG. 3 is a flowchart illustrating a method for assigning a parameter score, according to an embodiment.

FIG. 3 is a flowchart illustrating a method for assigning a parameter score, according to an embodiment.

Referring to FIG. 3, according to an embodiment, the method for assigning the parameter score may include comparing the character recognition result with the parameter (S210), determining whether the character recognition result includes the parameter (S220), allocating a first value to the parameter score when the result of S220 is positive (S231), and allocating a second value to the parameter score when the result of S220 is negative (S232). Although FIG. 3 illustrates that S210 to S231, or S210 to S232 are sequentially performed, the present disclosure is not limited thereto. For example, some steps may be omitted, or a new step may be added.

The comparing of the character recognition result with the parameter (S210) may include comparing a result, which is obtained by applying character recognition to the ID card image obtained from the user terminal 2000 with the at least one parameter. In detail, the user authenticating server 1000 may perform the comparison to determine whether the at least one parameter is included in the character recognition result.

For example, the at least one parameter may include a name, the date of birth, an ID card number, an ID type, an expiration date, an issue date, a gender, and a nationality. In addition, the character recognition result may include a name, the date of birth, a gender, and a nationality. In this case, the user authenticating server 1000 may perform whether the parameter is included in the character recognition result (S220).

In the above description, the user authenticating server 1000 may determine that the name, the date of birth, the gender, and the nationality of the at least one parameter is included in the character recognition result, but other parameters are not included in the character recognition result.

When the result of S220 is positive, the allocating of the first value to the parameter score (S231) may include assigning, by the user authenticating server 1000, the first value serving as the parameter score, to the parameter included in the character recognition result. For example, the user authenticating server 1000 may allocate the first value (e.g., '1') serving as the parameter score, to the name, the date of birth, the gender, and the nationality.

When the result of S220 is negative, the allocating of the second value to the parameter score (S232) may include assigning, by the user authenticating server 1000, the second value serving as the parameter score, to the parameter not included in the character recognition result. In this case, the second value may be smaller than the first value, but the present disclosure is not limited thereto. For example, the user authenticating server 1000 may assign the second value (e.g., '0.5') serving as the parameter score to the ID card number, the ID type, the expiration date, and the issue date.

Figure 4:
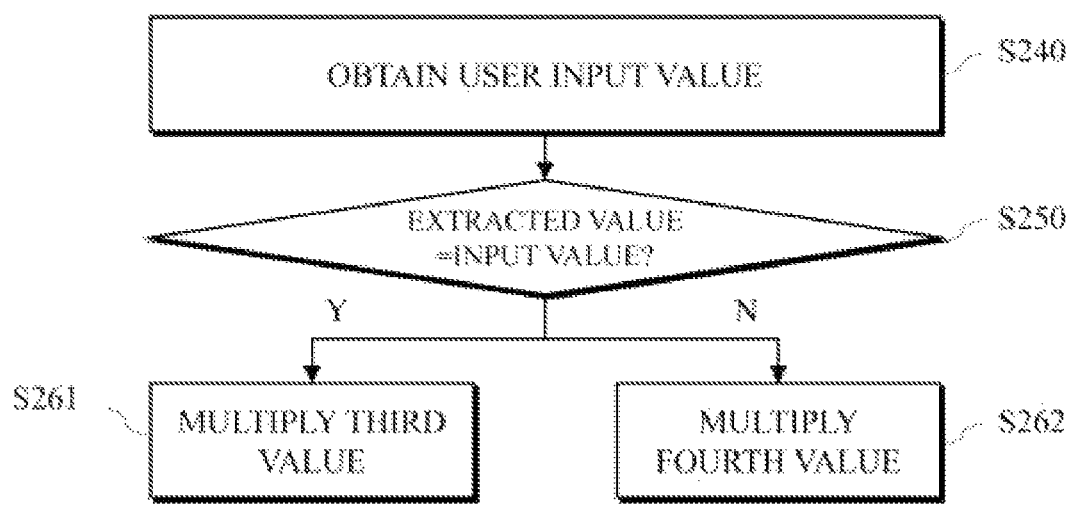
FIG. 4 is a flowchart illustrating a method for assigning a parameter score, according to another embodiment.

FIG. 4 is a flowchart illustrating a method for assigning a parameter score, according to another embodiment.

Referring to FIG. 4, according to another embodiment, the method for assigning the parameter score includes obtaining a user input value (S240), determining whether the character recognition result (extraction result) is the same as the user input value (S250), multiplying the parameter score by a third value, when the result of S250 is positive (S261), and multiplying the parameter score by a fourth value, when the result of S250 is negative (S262). Although FIG. 3 illustrates that S210 to S231, or S210 to S232 are sequentially performed, the present disclosure is not limited thereto. For example, some steps may be omitted, or a new step may be added.

The obtaining of the user input value (S240) may include obtaining, by the user authenticating server 1000, data input by the user, from the user terminal 2000. In detail, after the user captures the ID card image, the user authenticating server 1000 may identify, through the user terminal 2000, a result obtained by applying character recognition to the ID card image. Accordingly, the user may determine whether the character recognition result is the same as the information about the ID card. When the character recognition result is different form the information about the ID card, the user may modify and/or input the value for each parameter. In this case, the value input by the user may be different from the information about the ID card, which is not considered in the present step.

The determining of whether the character recognition result (extraction result) is the same as the user input value (S250) may include comparing, by the user authenticating server 1000, the data obtained in S240 with the character recognition result. The user authenticating server 1000 may multiply the parameter score by the third value when the result of S250 is positive (S261). The user authenticating server 1000 may multiply the parameter score by a fourth value, when the result of S250 is negative (S262). In this case, the fourth value may be smaller than the third value, but the present disclosure is not limited thereto.

Figure 5:
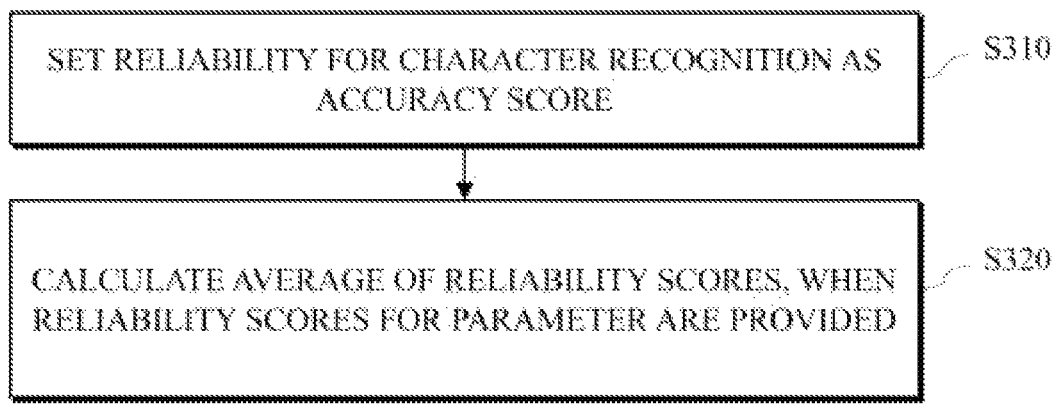
FIG. 5 is a flowchart illustrating a method for assigning an accuracy score, according to an embodiment.

FIG. 5 is a flowchart illustrating a method for assigning an accuracy score, according to an embodiment.

Referring to FIG. 5, according to an embodiment, the method for assigning the accuracy score may include setting the reliability for the character recognition as the accuracy score (S310) and calculating the average of a plurality of reliability scores, when a plurality of reliability scores for the parameter are provided (S320). Although FIG. 5 illustrates that S310 to S320 are sequentially performed, the present disclosure is not limited thereto. For example, some steps may be omitted, or a new step may be added.

The user authenticating server 100 may extract information included in the ID card image through an OCR technology or an artificial intelligence (AI) model for extracting a text, and may obtain the reliability for the extracted information. The user authenticating server 1000 may set the reliability obtained once as the accuracy score (S310).

However, multiple pieces of information are extracted with respect to the parameter. Accordingly, multiple reliabilities may be provided with respect to the multiple pieces of information. For example, when three names (FIRST NAME, MIDDLE NAME, and LAST NAME) are provided, the character recognition result may include three pieces of information and three reliabilities with respect to the parameter of the name. In this case, the user authenticating server 1000 may calculate the average of a plurality of reliability scores, when the plurality of reliability scores are provided with respect to the parameter. The user authenticating server 1000 may set the average of the plurality of reliability scores as the accuracy score.

Figure 6:
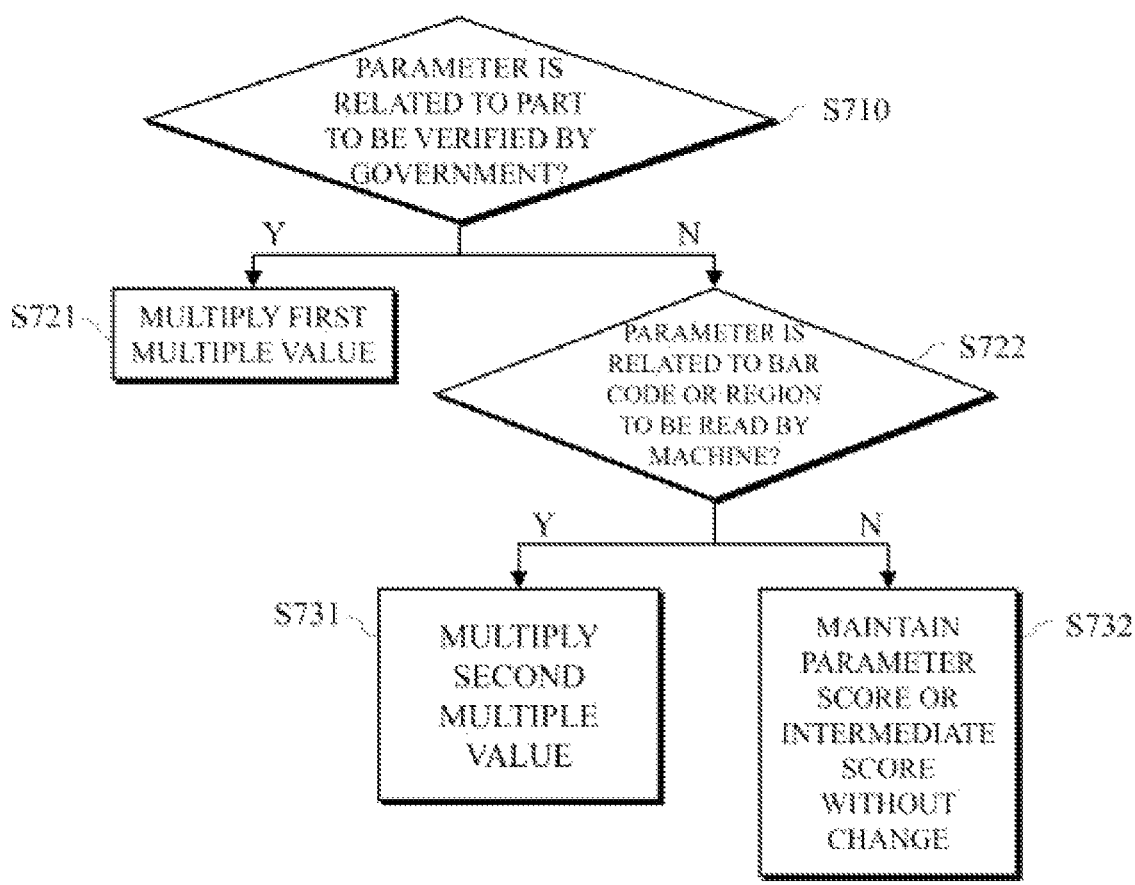
FIG. 6 is a flowchart of a method using a multiple value, according to an embodiment.

FIG. 6 is a flowchart of a method using a multiple value, according to an embodiment.

Referring to FIG. 6, according to an embodiment, the method using the multiple value may include determining whether a parameter is related to the verification by the government (S710), multiplying the parameter score or the intermediate score by a first multiple value, when the result of S710 is positive (S721), determining whether the parameter is related to a bar code or a region to be read by a machine when the result of S710 is negative (S722), multiplying the parameter score or the intermediate score by the second multiple value, when the result of S722 is positive (S731), and maintain the parameter score or the intermediate score without change when the result of S722 is negative (S732).

In detail, the user authenticating server 1000 may include multiplying the parameter score or the intermediate score by the first multiple value, when the parameter is related to the verification by the government (S721), In addition, the user authenticating server 1000 may multiply the intermediate score (or the parameter score) by the second multiple value, when the parameter is related to the bar code or a region to be read by the machine (S731). In this case, the second multiple value may be smaller than the first multiple value.

For example, the user authenticating server 1000 may determine whether the information about the parameter is matched with information in a database of the government, based on the information provided by the government. In this case, when the parameter is included in the database of the government, the user authenticating server 1000 may multiply the parameter by the first multiple value (e.g., '3'). For example, the parameter related to the verification by the government may be a name, or the date of birth, but the present disclosure is not limited thereto.

In addition, for example, the user authenticating server 1000 may determine the matching state of the information, through the bar code or the region to be read by the machine. In this case, when the parameter is verified through the bar code or the region to be read by the machine, the user authenticating server 1000 may multiply the parameter by the second multiple value (e.g., '2'). For example, the parameter related to the bar code or the region to be read by the machine may be the issue date or the expiration date, but the present disclosure is not limited thereto.

As described above, when the information about the parameter is verified through an external database, the user authenticating server 1000 may increase the parameter score using a multiple value, because the information has higher reliability.

In addition, the user authenticating server 1000 may compare a score, which is obtained by multiplying the multiple value, with a reference value. The user authenticating server 1000 may select the smaller value among the score obtained by multiplying the multiple value and the reference value. For example, when the score obtained by multiplying the multiple value is '1.5', and the reference value is '1', the user authenticating server 1000 may select and/or set '1' as the intermediate score. In addition, for example, when the score obtained by multiplying the multiple value is '0.7', and the reference value is '1', the user authenticating server 1000 may select and/or set '0.7' as the intermediate score.

Figure 7:
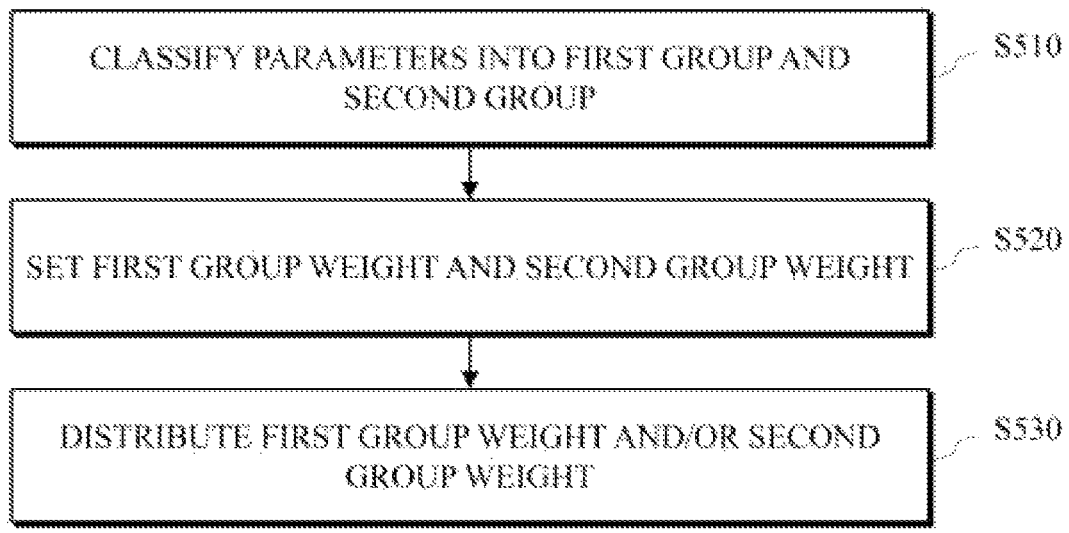
FIG. 7 is a flowchart illustrating a method for setting a weight related to a priority, according to an embodiment.

FIG. 7 is a flowchart illustrating a method for setting a weight related to a priority, according to an embodiment.

Referring to FIG. 7, according to an embodiment, a method of setting a weight related to priority includes classifying parameters into a first group and a second group (S510), setting a first group weight and a second group weight (S520) and distributing the first group weight and/or distributing the second group weight (S530). Although FIG. 7 illustrates that S510 to S530 are sequentially performed, the present disclosure is not limited thereto. For example, some steps may be merged and simultaneously performed, or a new step may be added between S510 and S530.

The classifying of the parameters into the first group and the second group (S510) may include grouping at least one parameter used by the user authenticating server 1000 for authentication, based on a criterion. Specifically, the user authenticating server 1000 may classify parameters included in at least one parameter into a first group related to user authentication and a second group related to verification of the ID card.

For example, the user authenticating server 1000 may classify the name, the date of birth, the ID number, and ID type as parameters related to user authentication and classify the name, the date of birth, the ID number, and the ID type into the first group. In addition, for example, the user authenticating server 1000 may classify the expiration date, the issue date, the gender, and the nationality as parameters related to the verification of the ID card and classify the expiration date, the issue date, the gender, and the nationality into the second group. However, the present disclosure is not limited thereto. The criterion of grouping the at least one parameter may be varied depending on a purpose or a case.

The setting of the first group weight and the second group weight (S520) may include setting, by the user authenticating server 1000, a weight to be applied to a score for the first group of parameter and a weight to be applied to a score for the second group of parameter. In this case, the first group weight may be larger than the second group weight, but the present disclosure is not limited thereto.

The user authenticating server 1000 may set the weight through an AI model trained. In addition, the user authenticating server 1000 may set the first weight, which is a weight for the parameter score, and the second weight, which is a weight for the accuracy score, a reference value, and a threshold value, in addition to a weight (which includes the first group weight and the second group weight) for a priority, but the present disclosure is not limited thereto.

The distributing of the first group weight and/or the distributing of the second group weight (S530) may include distributing a weight set by the user authenticating server 1000 in S520 to parameters included in the group.

In detail, the user authenticating server 1000 may set a weight for each of the parameters included in the first group, such that the sum of the weights of the parameters included in the first group is equal to the first group weight. In addition, the user authenticating server 1000 may set a weight for each of the parameters included in the second group, such that the sum of the weights of the parameters included in the second group is equal to the second group weight.

In this case, the weight for any one parameter included in the second group may be set not exceed a threshold value. This is to prevent the weight of the parameter included in the second group from being greater than the weight of the parameter included in the first group related to the user authentication, when the number of parameter included in the second group is '1'. For example, the weight for any one parameter included in the second group may be set not to exceed 15%, but the present disclosure is not limited thereto.

FIGS. 8 and 9 are views illustrating an authentication score through a method for authenticating a user.

Referring to FIG. 8, the at least one parameter may include a name, the date of birth, an ID card number, an ID type, an issue date, an expiration date, a gender, and a nationality. The user authenticating server 1000 may classify four parameters of a name, the date of birth, an ID card number, an ID type into the first group related to the user authentication. In addition, the user authenticating server 1000 may classify a total of four parameters of the issue date, the expiration date, the gender, and the nationality into the second group related to the verification of the ID card.

First, the user authenticating server 1000 may calculate a parameter score "A", based on a result of applying the character recognition technology to the ID card image. Specifically, when a parameter is included in the character recognition result, the user authenticating server 1000 may assign '1' to the parameter score. When the parameter is not included in the character recognition result, the user authenticating server 1000 may assign '0.5' to the parameter score.

The user authenticating server 1000 may compare a user input value obtained through the user terminal 2000 with the character recognition result. When the user does not modify the character recognition result or the user input value is matched with the character recognition result according to a result of the comparison, the user authenticating server 1000 may assign '1' to a weight 'B'. When the user modifies the character recognition result or the user input value is not matched with the character recognition result, the user authentication server 1000 may assign '0.5' to the weight 'B'. In this case, a similarity score other than the weight of '1' or '0.5' may be assigned to the 'name' parameter. FIG. 8 illustrates that the user authenticating server 1000 may assign the weight having the similarity of '0.8' to the parameter of the 'name'.

The user authentication server 1000 may calculate a final parameter score (C) by performing an operation of multiplying a parameter score (A) based on the character recognition result and a weight (B) based on the user input value. Thereafter, the user authenticating server 1000 may assign an accuracy score (D) using the reliability of the character recognition result.

The user authenticating server 1000 may calculate an intermediate score (E) by applying a first weight (e.g., 0.7) to the final parameter score (C) and a second weight (e.g., 0.3) to the accuracy score (D). The user authenticating server 1000 may set a multiple value (F) according to the characteristics of the parameter.

The user authenticating server 1000 may apply the multiple score (F) to the intermediate score (E). The user authenticating server 1000 may compare a score (G) in which the multiple value is reflected, with a reference value (e.g., '1'). The user authenticating server 1000 may perform the selection (H) for the less one among a score (G) obtained by reflecting the multiple value, and the reference value.

The user authentication server 1000 may set the first group weight for the first group and THE second group weight for the second group. FIG. 8 illustrates that the first group weight may be 70%, and the second group weight may be 30%. The user authenticating server 1000 may distribute the first group weight to the parameter included in the first group. For example, the user authenticating server 1000 may set a value, which is obtained by dividing the first group weight by the number of parameters included in the first group, as the weight for the parameters included in the first group, but the present disclosure is not limited thereto.

The user authenticating server 1000 may distribute the group weight to the parameter and apply (I) the distributed weight. The user authenticating server 1000 may finally calculate an authentication score (J) by summing scores calculated for at least one parameter.

Referring to FIG. 9, according to another embodiment, at least one parameter may include a name, a date of birth, a gender, and a nationality. The user authenticating server 1000 may classify a total of two parameters of a name and a date of birth, into the first group related to user authentication. In addition, the user authenticating server 1000 may classify a total of two parameters of a gender and nationality into a second group related to the verification of the ID card.

As illustrated in FIG. 8, the user authenticating server 1000 may assign a parameter score (A) based on a character recognition result, set a weight (B) based on a user input value, calculate a final parameter score (C), set an accuracy score (D), calculate an intermediate score (E), set a multiple value (F), apply a multiple value (G), compare with a reference value (H), apply a group weight (I), and finally calculate an authentication score (J).

The method according to an embodiment may be implemented in the form of a program instruction and may be recorded in a computer-readable recording medium. The computer-readable recording medium may include a single program instruction, a single data file, or a single data structure or the combination thereof. The program instruction recorded in the medium is particularly designed and configured for an embodiment, or well known by those skilled in the art and used. Examples of computer-readable recording media include magnetic media, such as a hard disk, a floppy disk, and a magnetic tape, optical media, such as a CD-ROM, or a DVD, magnetic-optical media, such as a floppy disk, and a hardware device, such as a ROM, a RAM, a flash memory, that is specially configured to store and execute a program instruction. In addition, the program may include not only a mechanical code such as things generated by a compiler but also a high-level language code executable on a computer using an interpreter. The hardware device may be configured to operate in the form of at least one software module to perform the operation of an embodiment, and vice versa.

According to an embodiment of the present disclosure, the method for authenticating the user by enabling the automated eKYC process may be provided.

Hereinabove, although the present disclosure has been described with reference to embodiments and the accompanying drawings, the present disclosure is not limited thereto, but may be variously modified and altered by those skilled in the art to which the inventive concept pertains without departing from the spirit and scope of the disclosure claimed in the following claims. For example, in the above descriptions, although the above-described method is performed in a different sequence, and/or the components of the system, the structure, the device, and the circuit described above are coupled or combined in the form different from the above-described manner.

Therefore, various modifications, various embodiments, and equivalents of the appended claims belong to the scope of the appended claims to be described later.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A method for authenticating a user, which is performed by
at least one processor, the method comprising:
obtaining an image of an identity (ID) card;
assigning a parameter score to at least one parameter included in the image of the ID card;
assigning an accuracy score to the at least one parameter extracted through character recognition, based on the image of the ID card;
setting a first weight for the parameter score and a second weight for the accuracy score; setting a weight related to a priority for the at least one parameter; and calculating an authentication score based on the parameter score, the accuracy score, the first weight, the second weight, and the weight related to the priority; and
wherein the assigning of the parameter score includes:
comparing a result extracted through the character recognition based on the image of the ID card with the at least one parameter;
assigning a first value to the parameter score when a parameter included in the at least one parameter is included in the extracted result and a second value to the parameter score when the parameter included in the at least one parameter is not included in the extracted result; and
further comprising: obtaining a user input value for the at least one parameter, wherein the assigning of the parameter score includes:
comparing the extracted result with the user input value with respect to the at least one parameter; multiplying the parameter score by a third value when the extracted result is equal to the user input value and the parameter score by a fourth value when the extracted result is different from the user input value.

2. The method of claim 1, wherein the assigning of the accuracy score includes: setting a reliability score for the character recognition for the at least one parameter as the accuracy score; and setting an average of a plurality of reliability scores as a reliability score for one parameter when the plurality of reliability scores are provided for the one parameter.

3. The method of claim 1, wherein the first weight is higher than the second weight.

4. The method of claim 1, wherein the setting of the weight related to the priority includes: classifying parameters included in the at least one parameter into a first group related to user authentication and a second group related to verification of the ID card; setting a first group weight for the first group and a second group weight for the second group; setting a weight for each of parameters included in the first group, such that a sum of the weights of the parameters included in the first group is equal to the first group weight; and setting a weight for each of parameters included in the second group, such that a sum of the weights of the parameters included in second first group is equal to the second group weight.

5. The method of claim 4, wherein the first group weight is greater than the second group weight, and wherein a weight of one parameter included in the second group is set to be equal to or less than a threshold value.

6. The method of claim 4, wherein the weight of each parameter included in the first group is set as a value that the first group weight divided by the number of parameters included in the first group.

7. The method of claim 1, wherein the at least one parameter includes: at least one of a name, a date of birth, an ID card number, an ID type, an expiration date, an issue date, a gender, and a nationality.

8. The method of claim 4, wherein the first weight, the second weight, the first group weight, and the second group weight are set through an artificial intelligence (AI) model.

9. The method of claim 1, further comprising: authenticating an identify of a user corresponding to the image of the ID card, when the authentication score is equal to or greater than an authentication reference value.

10. A non-transitory computer program recorded in a computer-readable medium to execute the method for authenticating a user, which is performed by at least one processor, the method comprising:
obtaining an image of an identity (ID) card; assigning a parameter score to at least one parameter included in the image of the ID card;
assigning an accuracy score to the at least one parameter extracted through character recognition, based on the image of the ID card;
setting a first weight for the parameter score and a second weight for the accuracy score; setting a weight related to a priority for the at least one parameter; and
calculating an authentication score based on the parameter score, the accuracy score, the first weight, the second weight, and the weight related to the priority; and
wherein the assigning of the parameter score includes:
comparing a result extracted through the character recognition based on the image of the ID card with the at least one parameter; assigning a first value to the parameter score when a parameter included in the at least one parameter is included in the extracted result and a second value to the parameter score when the parameter included in the at least one parameter is not included in the extracted result; and further comprising:

obtaining a user input value for the at least one parameter, wherein the assigning of the parameter score includes: comparing the extracted result with the user input value with respect to the at least one parameter;

multiplying the parameter score by a third value when the extracted result is equal to the user input value and the parameter score by a fourth value when the extracted result is different from the user input value.

11. A method for authenticating a user, which is performed by at least one processor, the method comprising:

obtaining an image of an identity (ID) card;

assigning a parameter score to at least one parameter included in the image of the ID card; assigning an accuracy score to the at least one parameter extracted through character recognition, based on the image of the ID card;

setting a first weight for the parameter score and a second weight for the accuracy score; setting a weight related to a priority for the at least one parameter; and calculating an authentication score based on the parameter score, the accuracy score, the first weight, the second weight, and the weight related to the priority; and wherein the assigning of the parameter score includes: comparing a result extracted through the character recognition based on the image of the ID card with the at least one parameter;

assigning a first value to the parameter score when a parameter included in the at least one parameter is included in the extracted result and a second value to the parameter score when the parameter included in the at least one parameter is not included in the extracted result; and wherein the assigning of the parameter score includes:

multiplying the parameter score by a first multiple value when the parameter included in the at least one parameter is related to verification by the government and the parameter score by a second multiple value smaller than the first multiple value when the parameter is related to a bar code or a region to be read by a machine; and setting a reference value as the parameter score when the parameter score is greater than the reference value.

* * * * *